US012684665B2

(12) United States Patent
Hwang et al.

(10) Patent No.: US 12,684,665 B2
(45) Date of Patent: Jul. 14, 2026

(54) PULSE WIDTH MODULATION SIGNAL GENERATION CIRCUIT AND LAMP CONTROL SYSTEM INCLUDING THE SAME

(71) Applicant: LX SEMICON CO., LTD., Daejeon (KR)

(72) Inventors: Won Joon Hwang, Daejeon (KR); Nak Hun Kim, Daejeon (KR); Byung Jun Seo, Daejeon (KR); Ju Hyun Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 91 days.

(21) Appl. No.: 18/535,097

(22) Filed: Dec. 11, 2023

(65) Prior Publication Data

US 2024/0196493 A1 Jun. 13, 2024

(30) Foreign Application Priority Data

Dec. 13, 2022 (KR) ........................ 10-2022-0173355
Sep. 7, 2023 (KR) ........................ 10-2023-0118792

(51) Int. Cl.
*H05B 45/325* (2020.01)

(52) U.S. Cl.
CPC .................................. *H05B 45/325* (2020.01)

(58) Field of Classification Search
CPC ...... H05B 45/00; H05B 45/30; H05B 45/325; B60Q 1/30; H03K 3/017; H03K 7/08; H03K 3/0233; H03K 5/04
See application file for complete search history.

(56) References Cited

U.S. PATENT DOCUMENTS 4,891,828 A 1/1990 Kawazoe
7,184,480 B1 * 2/2007 Gheorghiu ............... H03K 7/08 375/353

(Continued)

OTHER PUBLICATIONS

Extended European Search Report dated Sep. 30, 2024 issued for the European Patent Application No. 23214541.7, 16 pages.

(Continued)

*Primary Examiner* — Thai Pham
(74) *Attorney, Agent, or Firm* — ROTHWELL, FIGG, ERNST & MANBECK, P.C.

(57) ABSTRACT

Disclosed are a pulse width modulation (PWM) signal generation circuit and a lamp control system including the same. The PWM signal generation circuit includes a counting circuit configured to generate a counting signal, a pulse period control circuit configured to convert the counting signal into a first analog output signal and compare the first analog output signal with a first comparison voltage to generate a first output signal, a pulse width control circuit configured to convert the counting signal into a second analog output signal and to compare the second analog output signal with a second comparison voltage to generate a second output signal, and a control logic circuit configured to determine a period of a PWM signal based on the first output signal, determine a pulse width of the PWM signal based on the second output signal, and output the PWM signal having the period and the pulse width.

5 Claims, 7 Drawing Sheets

(56) References Cited

U.S. PATENT DOCUMENTS

| | | | | |
|---|---|---|---|---|
| 2013/0015798 | A1* | 1/2013 | Wright | H03K 7/08 323/241 |
| 2016/0315466 | A1* | 10/2016 | Chen | G06F 1/26 |
| 2017/0013358 | A1* | 1/2017 | Zuo | H03F 3/185 |
| 2019/0327809 | A1 | 10/2019 | Watsuda | |
| 2021/0058072 | A1 | 2/2021 | Zhao | |

OTHER PUBLICATIONS

Partial European Search Report dated May 29, 2024 issued for the European Patent Application No. 23214541.7, 13 pages.

* cited by examiner

PULSE WIDTH MODULATION SIGNAL GENERATION CIRCUIT AND LAMP CONTROL SYSTEM INCLUDING THE SAME

This application claims the benefit of Korean Patent Application Nos. 10-2022-0173355, filed on Dec. 13, 2022 and 10-2023-0118792 filed on Sep. 7, 2023, all of which are hereby incorporated by reference in their entirety as if fully set forth herein.

BACKGROUND OF THE DISCLOSURE

Technical Field

The present disclosure relates to a circuit for generating a pulse width modulation signal.

Background

Pulse width modulation (PWM) is a method of modulating a pulse wave by adjusting the pulse width of the pulse wave. Sometimes, PWM is also referred to as pulse-duration modulation (PDM).

PWM control is a pulse control method that modulates the pulse width, frequency, or both at each period to induce a defined output waveform.

PWM can vary the average voltage by varying the pulse width by adjusting the duty ratio of the pulse wave. By varying the pulse width in digital form, the amplitude of the analog output can be controlled.

The duty ratio, also called duty or duty cycle, represents the proportion of a signal with a high level (or a signal that is turned on) in the carrier period of a PWM signal.

The average output voltage depends on the duty ratio. A PWM signal represented by the repetition of a pulse wave has the same effect as outputting an average DC voltage.

The use of PWM signals is increasing in various fields because outputting analog output signals using the PWM method makes it possible to control the brightness of light-emitting diodes (LEDs), create various colors using RGB LEDs, or control the rotational speed of DC motors.

To generate PWM signals as described above, a PWM signal generation circuit is used. A general PWM signal generation circuit generates PWM signals by changing the charge and discharge time using resistors and capacitors outside the chip configured to generate PWM signals. However, when a charged capacitor is discharged using a resistor, there is a limitation that it is difficult to secure linear characteristics, and the resistor or capacitor affects the duty according to the change in temperature.

SUMMARY

An object of the present disclosure devised to solve the above-mentioned problems is to provide a pulse width modulation signal generation circuit capable of generating a PWM signal whose duty ratio remains constant even when the ambient temperature changes, and a lamp control system including the same.

Another object of the present disclosure is to provide a PWM signal generation circuit capable of improving a nonlinearity of a discharge voltage affecting a PWM signal, and a lamp control system including the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a pulse width modulation (PWM) signal generation circuit may include a counting circuit configured to generate a counting signal by counting one of a rising edge and a falling edge of a clock signal, a pulse period control circuit configured to convert the counting signal into a first analog output signal and to compare the first analog output signal with a first comparison voltage to generate a first output signal corresponding to a result of the comparison, a pulse width control circuit configured to convert the counting signal into a second analog output signal and to compare the second analog output signal with a second comparison voltage to generate a second output signal corresponding to a result of the comparison, and a control logic circuit configured to determine a period of a PWM signal based on the first output signal, determine a pulse width of the PWM signal based on the second output signal, and output the PWM signal having the period and the pulse width.

In another aspect of the present disclosure, a lamp control system may include a lamp, and a lamp driving circuit configured to drive the lamp, wherein the lamp driving circuit may include a switch configured to supply a driving signal for driving of the lamp to the lamp in response to a control signal, a PWM signal generation circuit configured to generate a PWM signal, and a current control circuit configured to generate the control signal in response to the PWM signal, wherein the PWM signal generation circuit is configured to generate a first output signal based on a counting signal generated by counting a clock signal, determine a period of the PWM signal based on the first output signal, generate a second output signal based on the counting signal, and determine a pulse width of the PWM signal based on the second output signal.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the present disclosure and together with the description serve to explain the principle of the present disclosure. In the drawings.

DETAILED DESCRIPTION

Figure 1:
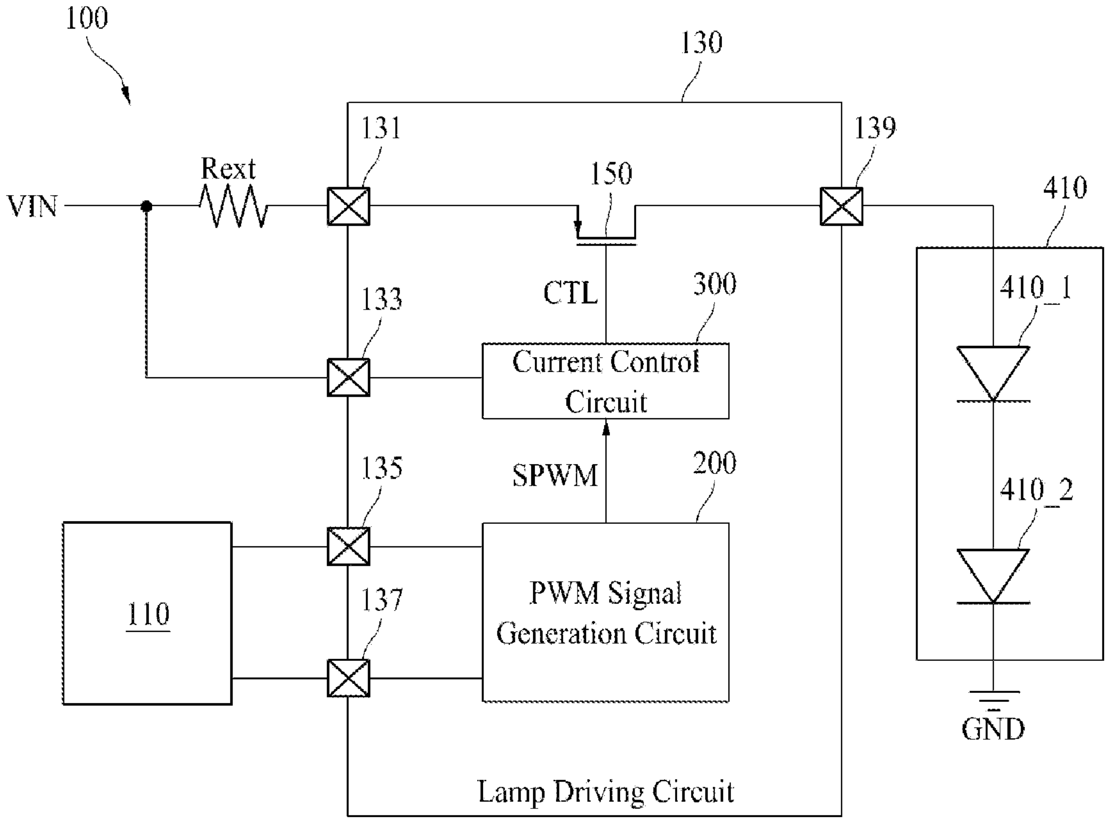
FIG. 1 is a block diagram of a lamp control system according to one embodiment of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present invention thorough and to fully inform one of ordinary skill in the art to which the present disclosure belongs of the scope of the invention. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted in order to avoid obscuring the gist of the present disclosure.

As used herein, the terms "includes," "has," "comprises," and the like should not be construed as being restricted to the means listed thereafter unless specifically stated otherwise. As used herein, the singular forms "a", "an", and "the" are intended to include the plural forms as well, unless the context clearly indicates otherwise.

Elements are to be interpreted a margin of error, even if not explicitly stated otherwise.

For example, when a positional relationship between two parts is described using terms such as "on top of", "on", "under", "next to", etc., one or more other parts may be positioned between the two parts, unless "immediately" or "directly" is used.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

It should be understood that the term "at least one" includes all possible combinations of one or more related items. For example, the phrase "at least one of the first, second, and third items" can mean each of the first, second, or third items, as well as any possible combination of two or more of the first, second, and third items.

Features of various embodiments of the present disclosure can be partially or fully combined. As will be clearly appreciated by those skilled in the art, various interactions and operations are technically possible. Embodiments can be practiced independently of each other or in conjunction with each other.

Hereinafter, embodiments of the present disclosure will be described in detail with reference to the accompanying drawings.

FIG. 1 is a block diagram of a lamp control system according to one embodiment of the present disclosure. Referring to FIG. 1, a lamp (or light) control system 100 includes a resistor Rext, a regulation circuit 110 including a plurality of resistors, a lamp driving circuit 130, and a lamp 410.

The lamp driving circuit 130 may be implemented as an integrated circuit (IC), a semiconductor chip, or a field-programmable gate array (FPGA).

The lamp driving circuit 130 includes a plurality of pins 131, 133, 135, 137, and 139, a switch circuit 150, a pulse width modulation (PWM) signal generation circuit 200, and a current control circuit 300. Each of the pins 131, 133, 135, 137, and 139 is a connection terminal and may be referred to as a pad.

An input voltage VIN is supplied to a first pin 131 via the resistor Rext. The input voltage VIN, which is used as the operating voltage for the current control circuit 300, is supplied to the current control circuit 300 via the second pin 133.

The regulation circuit 110, which includes a plurality of resistors, may be connected to the PWM signal generation circuit 200 via a plurality of pins 135 and 137 to regulate the voltage applied to the PWM signal generation circuit 200. In particular, the regulation circuit 110 may regulate a first reference voltage VREFP1 applied to a first digital-to-analog (DA) conversion circuit 221 and a third reference voltage VREFP3 applied to a second DA conversion circuit 231 in PWM signal generation circuits 200-1, 200-2, and 200-3 illustrated in FIGS. 3, 6, and 7, which will be described later.

In one embodiment, the regulation circuit 110 may be positioned physically separated from the PWM signal generation circuit 200 to facilitate regulation of the applied voltages.

The PWM signal generation circuit 200 may generate a PWM signal SPWM and output the same to a current control circuit 300, and the current control circuit 300 may generate a control signal CTL based on the PWM signal SPWM. The switch circuit 150 may be turned on or off in response to the control signal CTL.

For example, the switch circuit 150 may be turned on in response to the control signal CTL generated by the current control circuit 300 when the PWM signal SPWM is at a high level, and may be turned off in response to the control signal CTL generated by the current control circuit 300 when the PWM signal SPWM is at a low level.

The switch circuit 150 controls the connection between the first pin 131 and the fifth pin 139, and supplies, in response to the control signal CTL, a driving signal to the lamp 410 to drive the lamp 410. In one embodiment, the switch circuit 150 may be implemented as a PMOS transistor.

The lamp 410 is connected between the fifth pin 139 and ground GND and flashes (or turns on/off) in response to the on/off operation of the switch circuit 150. In one embodiment, the lamp 410 may include a plurality of LEDs 410_1 and 410_2 connected in series or parallel.

Figure 2:
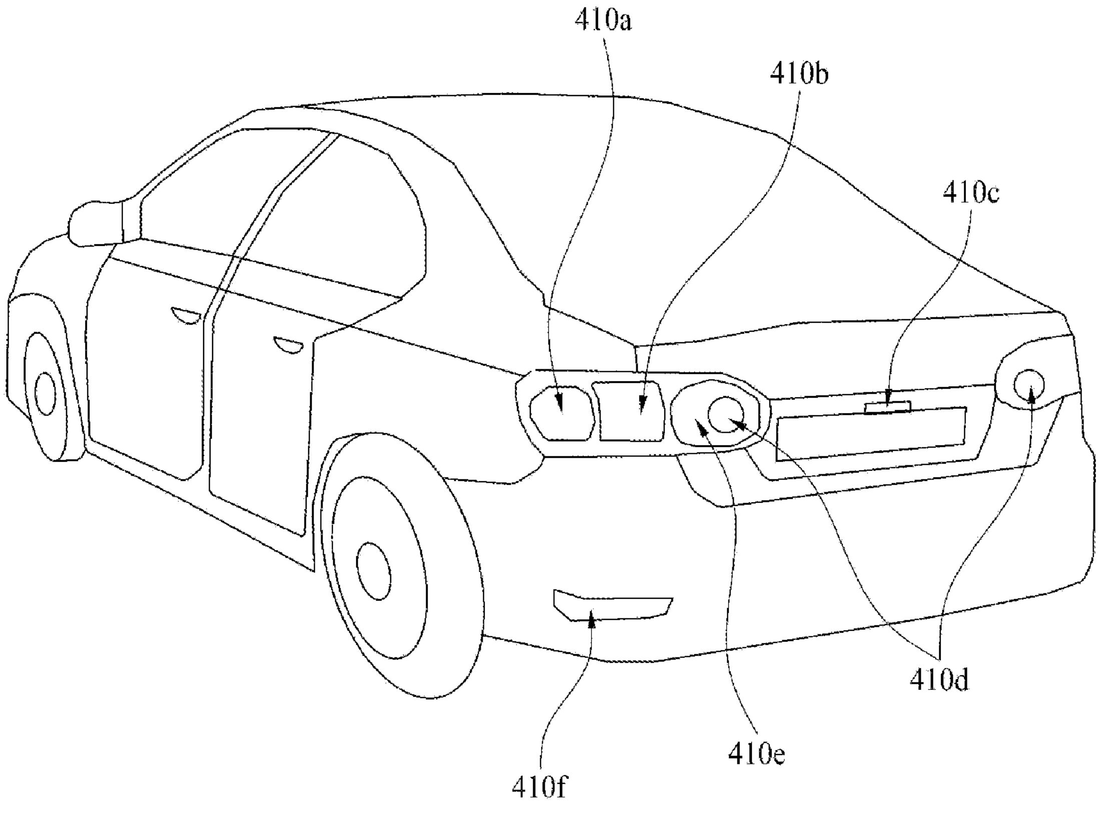
FIG. 2 is a diagram illustrating a vehicle rear lamp control system in which the lamp control system illustrated in FIG. 1 is used.

In one embodiment, the lamp control system 100 as described above may be included (or installed) in a vehicle as exemplarily shown in FIG. 2 to control the operation of a rear lamp of the vehicle.

That is, the lamp control system 100 of FIG. 1 may be used as a rear lamp control system of a vehicle. According to this embodiment, the lamp 410 may be a direction indicator or turn signal lamp 410*a*, a parking lamp 410*b*, a license plate lamp 410*c*, a reverse lamp 410*d*, a tail lamp or brake lamp 410*e*, or a rear fog lamp 410*f*, as shown in FIG. 2.

In the embodiment described above, the PWM signal generation circuit is described as being applied to the lamp control system 100 for simplicity of description. However, it should be noted that the PWM signal generation circuit 200 according to the present disclosure is applicable to any type of device in which a PWM signal is utilized.

Hereinafter, a PWM signal generation circuit according to one embodiment of the present disclosure will be described in detail with reference to FIGS. 3 to 5.

Figure 3:
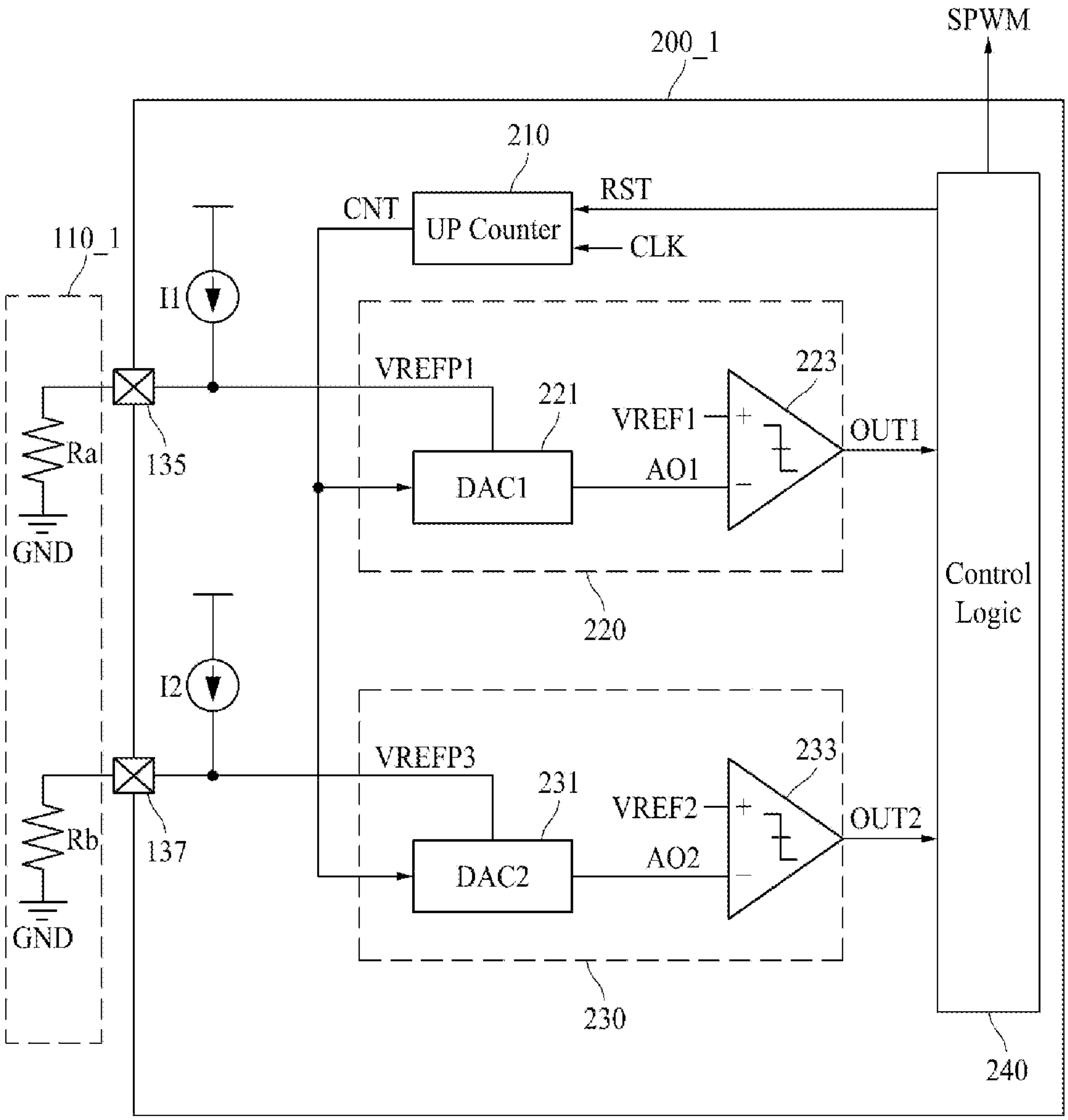
FIG. 3 is a block diagram of a PWM signal generation circuit according to one embodiment of the present disclosure.
Figure 4:
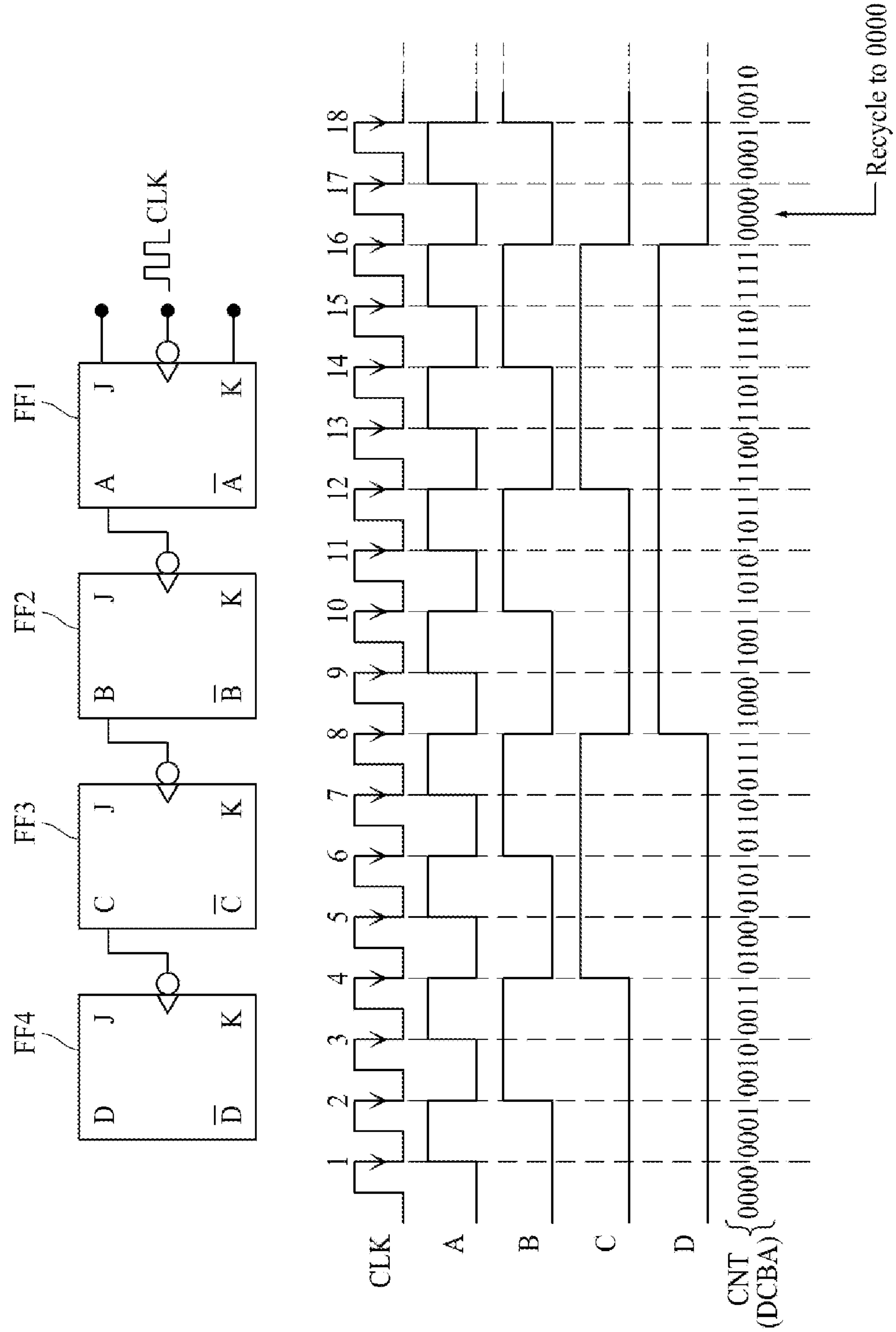
FIG. 4 is an exemplary block diagram of a counting circuit shown in FIG. 3.

FIG. 3 is a block diagram of a PWM signal generation circuit according to one embodiment of the present disclosure. FIG. 4 is an exemplary block diagram of a counting circuit shown in FIG. 3. FIG. 5 is a timing diagram of first and second analog output signals, first and second reset signals, first and second output signals, and a PWM signal.

A regulation circuit 110_1 and a PWM signal generation circuit 200-1 shown in FIG. 3 may be an example of the regulation circuit 110 and the PWM signal generation circuit 200 shown in FIG. 1, respectively.

For simplicity, FIG. 3 illustrates the regulation circuit 110_1 that includes a first resistor Ra and a second resistor Rb, and the PWM signal generation circuit 200_1 together.

The first resistor Ra is connected between a third pin 135 and the ground GND, and the second resistor Rb is connected between a fourth pin 137 and the ground GND.

The PWM signal generation circuit 200_1 includes the third pin 135, the fourth pin 137, a first current source, a second current source, a counting circuit 210, a pulse period control circuit 220, a pulse width control circuit 230, and a control logic circuit 240.

The first current source supplies a first current I1 to the third pin 135, and the second current source supplies a second current I2 to the fourth pin 137.

The counting circuit 210 counts a clock signal CLK to generate a counting signal CNT that increases at regular intervals. The counting circuit 210 may be, for example, an up counter that counts the clock signal CLK to generate a counting signal CNT that increases at regular intervals. The counting circuit 210 supplies the generated counting signal CNT to the pulse period control circuit 220 and the pulse width control circuit 230.

The counting circuit 210 may be an up counter circuit having a plurality of flip-flops connected in series. For example, as shown in FIG. 4, the counting circuit 210 is composed of JK flip-flops FF1 to FF4 connected in series that receive a first input signal J, a second input signal K, and a clock signal CLK as inputs, and output a non-inverted output signal A and an inverted output signal $\overline{A}$). The first JK flip-flop FF1 receives the clock signal CLK, inverts the clock signal CLK, and outputs the non-inverted output signal A, which transitions from the low level (L) to the high level (H) when the level of the inverted signal of the first clock signal CLK transitions from the low level (L) to the high level (H). Accordingly, the first JK flip-flop FF1 outputs the non-inverted output signal A that transitions from the low level (L) to the high level (H) at the falling edge of the input clock signal CLK. That is, when the clock signal CLK is input to the first JK flip-flop FF1, a signal with a period twice as long as that of the clock signal CLK is output as the non-inverted output signal A.

The second to fourth JK flip-flops FF2 to FF4 operate in the same manner as the first JK flip-flop FF1. Accordingly, the non-inverted output signal A of the first JK flip-flop FF1 is input to the second JK flip-flop FF2 as a clock signal, and a signal having a period that is twice the period of the non-inverted output signal A of the first JK flip-flop FF1 and four times the period of the clock signal CLK is output as the non-inverted output signal B of the second JK flip-flop FF2. The non-inverted output signal B of the second JK flip-flop FF2 is input to the third JK flip-flop FF3 as a clock signal, and a signal having a period that is twice the period of the non-inverted output signal B of the second JK flip-flop FF2, four times the period of the non-inverted output signal A of the first JK flip-flop FF1, and eight times the period of the clock signal CLK is output as a non-inverted output signal C of the third JK flip-flop FF3. The non-inverted output signal C of the third JK flip-flop FF3 is input to the fourth JK flip-flop FF4 as a clock signal, and a signal having a period that is twice the period of the non-inverted output signal C of the third JK flip-flop FF3, four times the period of the non-inverted output signal B of the second JK flip-flop FF2, eight times the period of the non-inverted output signal A of the first JK flip-flop FF1, sixteen times the period of the clock signal CLK is output as the non-inverted output signal D of the fourth JK flip-flop FF4. The counting signal CNT is thus a 4-bit parallel data including a non-inverted output signal A output from the first JK flip-flop FF1 as the lowest-order bit, a non-inverted output signal B output from the second JK flip-flop FF2 as the second lowest-order bit, a non-inverted output signal C output from the third JK flip-flop FF3 as the third lowest-order bit, and a non-inverted output signal D output from the fourth JK flip-flop FF4 as the highest-order bit. Accordingly, the counting signal CNT may be incremented by 1 on a binary basis according to the period of the clock signal CLK input to the first JK flip-flop FF1.

Thus, the counting circuit 210 generates a counting signal CNT that increases at the same period as the clock signal CLK by counting one of the rising edge and falling edge of the clock signal CLK. For example, as shown in FIG. 4, the counting circuit 210 counts the falling edge of the clock signal CLK to generate a counting signal CNT that is 4-bit parallel data (DCBA) that increments by 1 at the period of the clock signal CLK.

The counting circuit 210 resets the counting signal CNT to an initial value according to a reset signal RST. The counting circuit 210 may reset the counting signal CNT to the initial value (e.g., 2b'0000) when the counting signal CNT reaches a maximum value (e.g., 2b'1111), or may reset the counting signal CNT to the initial value when the reset signal RST is input.

However, embodiments are not limited thereto. the counting circuit 210 may include a first counting circuit and a second counting circuit that provide a first counting signal and a second counting signal to the pulse period control circuit 220 and the pulse width control circuit 230, respectively. Specifically, the counting circuit 210 may include a first counting circuit that generates a first counting signal CNT1 that increases at a given period by counting one of the rising edge and the falling edge of the clock signal CLK to provide the first counting signal CNT1 to the pulse period control circuit 220 and resets the first counting signal CNT1 according to a first reset signal; and a second counting circuit that generates a second counting signal CNT2 that increases at a given period by counting one of the rising edge and the falling edge of the clock signal CLK to provide the second counting signal CNT2 to the pulse width control circuit 230 and resets the second counting signal CNT2 according to a second reset signal. In this case, the structure and operation of the first counting circuit 211 may be the same as those of the second counting circuit 212.

The pulse period control circuit 220 converts the counting signal CNT output from the counting circuit 210 into a first analog output signal AO1. The pulse period control circuit 220 compares the first analog output signal AO1 with a first comparison voltage VREF1, and outputs a first output signal OUT1 according to the result of the comparison.

In one embodiment, the pulse period control circuit 220 may include a first DA conversion circuit 221 and a first comparison circuit 223.

Figure 5:
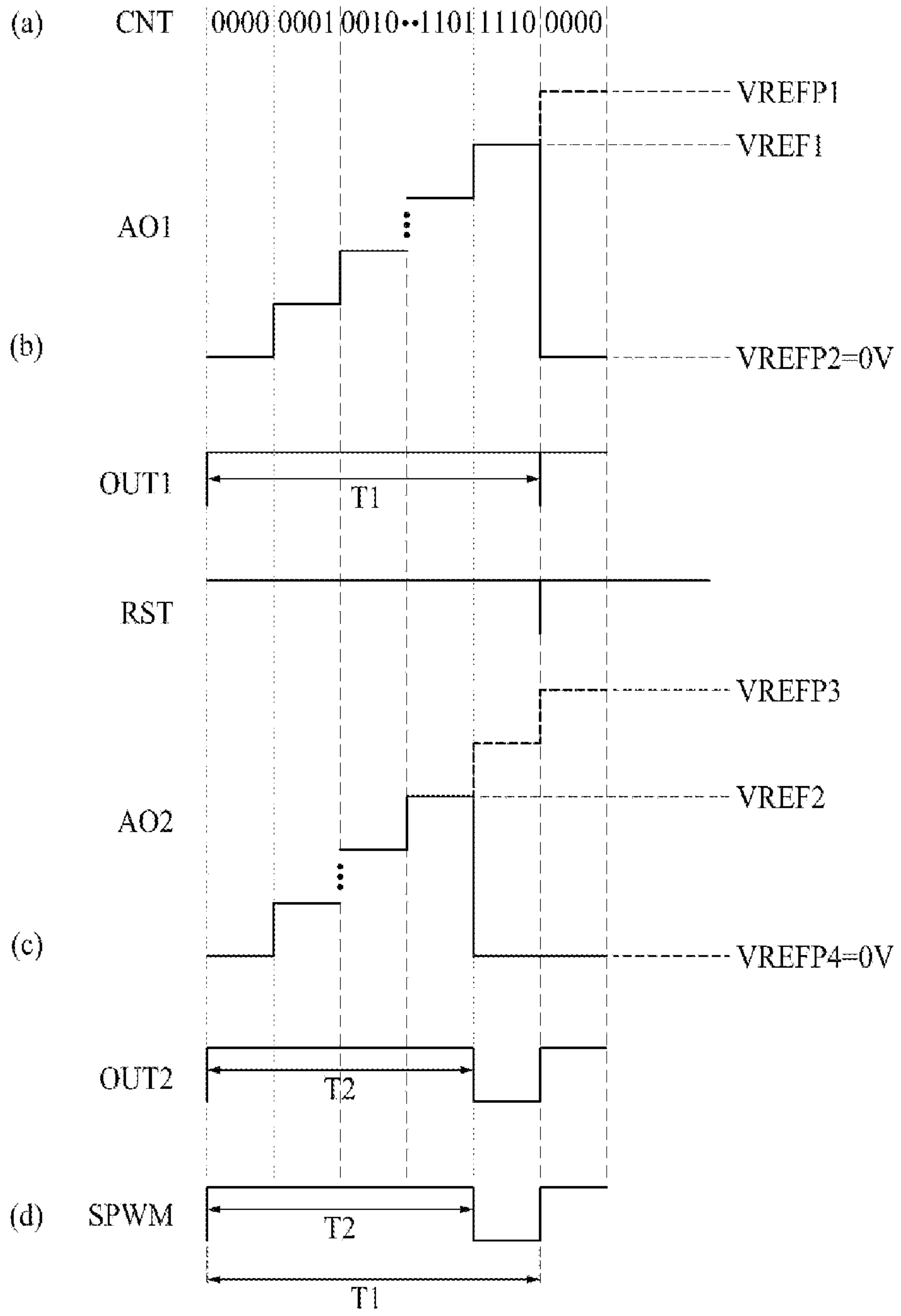
FIG. 5 is a timing diagram of first and second analog output signals, first and second reset signals, first and second output signals, and a PWM signal.

As shown in (a) and (b) of FIG. 5, the first DA conversion circuit 221 outputs a voltage corresponding to the counting signal CNT output from the counting circuit 210 as a first analog output signal AO1 from among the voltages less than or equal to a first reference voltage VREFP1 and greater than or equal to a second reference voltage VREFP2 (e.g., 0 V). For example, when the counting signal CNT is 0000, the first DA conversion circuit 221 may output the second reference voltage VREFP2 (e.g., 0 V) as the first analog output signal AO1.

The first comparison circuit 223 includes a non-inverting input terminal configured to receive the first comparison voltage VREF1, an inverting input terminal connected to the first DA conversion circuit 221, and an output terminal configured to output the first output signal OUT1. That is, the first comparison circuit 223 receives the first comparison voltage VREF1 and the first analog output signal AO1 of the first DA conversion circuit 221 via the non-inverting input terminal and the inverting input terminal, and compares the first comparison voltage VREF1 and the first analog output signal AO1. As shown in FIG. 5-(*b*), when the first analog output signal AO1 is less than the first comparison voltage VREF1, the first comparison circuit 223 outputs the first output signal OUT1 in a first state (e.g., high level (H)). When the first analog output signal AO1 is greater than the first comparison voltage VREF1, the first comparison circuit 223 outputs the first output signal OUT1 that has transitioned from the first state (e.g., high level (H)) to a second state (e.g., low level (L)).

The pulse width control circuit 230 converts the counting signal CNT output from the counting circuit 210 into a second analog output signal AO2. The pulse width control circuit 230 compares the second analog output signal AO2 and the second comparison voltage VREF2, and outputs a second output signal OUT2 according to the result of the comparison.

In one embodiment, the pulse width control circuit 230 includes a second DA conversion circuit 231 and a second comparison circuit 233.

As shown in (a) and (c) of FIG. 5, the second DA conversion circuit 231 outputs a voltage corresponding to the counting signal CNT output from the counting circuit 210 as a second analog output signal AO2 from among the voltages less than or equal to a third reference voltage VREFP3 and greater than or equal to a fourth reference voltage VREFP4 (e.g., 0 V). For example, when the counting signal CNT output from the counting circuit 210 is 0000, the second DA conversion circuit 231 may output the fourth reference voltage VREFP4 (e.g., 0 V) as the second analog output signal AO2.

The second comparison circuit 233 includes a non-inverting input terminal configured to receive the second comparison voltage VREF2, an inverting input terminal connected to the second DA conversion circuit 231, and an output terminal configured to output the second output signal OUT2. That is, the second comparison circuit 233 receives the second comparison voltage VREF2 and the second analog output signal AO2 of the second DA conversion circuit 231 via the non-inverting input terminal and the inverting input terminal, and compares the second comparison voltage VREF2 and the second analog output signal AO2. As shown in (c) of FIG. 5, when the second analog output signal AO2 is less than the second comparison voltage VREF2, the second comparison circuit 233 outputs the second output signal OUT2 in a first state (e.g., high level (H)). When the second analog output signal AO2 is greater than the second comparison voltage VREF2, the second comparison circuit 233 outputs the second output signal OUT2 that has transitioned from the first state (e.g., high level (H)) to a second state (e.g., low level (L)).

The control logic circuit 240 determines a reset timing for resetting the counting signal CNT based on a change in level of the first output signal OUT1 (or whether the level changes), and generates a PWM signal SPWM based on the first output signal OUT1 and the second output signal OUT2. Specifically, the control logic circuit 240 provides a reset signal RST for resetting the counting signal CNT to the counting circuit 210 using the first output signal OUT1. The control logic circuit 240 generates the reset signal RST that transitions from the high level (H) to the low level (L) at a moment when the first output signal OUT1 transitions from the first state (e.g., the high level (H)) to the second state (e.g., the low level (L)), as shown in (b) of FIG. 5. Thus, the counting signal CNT of the counting circuit 210 is reset to an initial value. However, embodiments are not limited thereto. When the first counting signal is input to the pulse period control circuit 220 and the second counting signal is input to the pulse width control circuit 230, the control logic circuit 240 may determine a reset timing for resetting each of the first counting signal and the second counting signal, and may provide a first reset signal to reset the first counting signal and a second reset signal to reset the second counting signal.

The control logic circuit 240 generates a PWM signal SPWM based on the change in level (or whether there is a change in level) of the first output signal OUT1 and the change in level (or whether there is a change in level) of the second output signal OUT2, and outputs the PWM signal to the current control circuit 300 of FIG. 1.

Referring to (d) of FIG. 5, a period of the PWM signal SPWM is defined as T1, and a pulse width of the PWM signal SPWM is defined as T2. In this case, the first reference voltage VREFP1 and the third reference voltage VREFP3 may be set such that the period T1 of the PWM signal SPWM has a value greater than the pulse width T2 of the PWM signal SPWM.

The control logic circuit 240 may calculate the period T1 of the PWM signal SPWM according to Equation 1, and may calculate the pulse width T2 of the PWM signal SPWM according to Equation 2.

$$T1 = VREF1/\left[\frac{VREFP1 - VREFP2}{2^{N1}}\right] \times 1/CLK \quad \text{[Equation 1]}$$

-continued $$T2 = VREF2/\left[\frac{VREFP3 - VREFP4}{2^{N2}}\right] \times 1/CLK \quad \text{[Equation 2]}$$

In Equation 1, VREF1 denotes the first comparison voltage, VREFP1 denotes the first reference voltage, VREFP2 denotes the second reference voltage, N1 denotes the number of bits of the first analog output signal output from the first DA conversion circuit 221, and CLK denotes the period of the clock signal. In Equation 2, VREFP3 denotes the third reference voltage, VREFP4 denotes the fourth reference voltage, VREF2 denotes the second comparison voltage, N2 denotes the number of bits of the second analog output signal AO2 output from the second DA conversion circuit 231, and CLK denotes the period of the clock signal.

Referring back to FIG. 3, in one embodiment, a voltage calculated as a product of the first current I1 supplied by the first current source and the resistance of the first resistor Ra connected between the third pin 135 and ground GND is applied to the first DA conversion circuit 221 via the third pin 135 as the first reference voltage VREFP1, and may be increased in response to the clock signal CLK by a value equal to the difference between the first reference voltage VREFP1 and the second reference voltage VREFP2 (e.g., 0 V) divided by the number of steps that can be output from the first DA conversion circuit 221, as shown in FIG. 5. Further, a voltage calculated as a product of the second current I2 supplied by the second current source and the resistance of the second resistor Rb connected between the fourth pin 137 and the ground GND is applied to the second DA conversion circuit 231 via the fourth pin 137 as the third reference voltage VREFP3, and may be increased in response to the clock signal CLK by a value equal to the difference between the third reference voltage VREFP3 and the fourth reference voltage VREFP4 divided by the number of steps that can be output from the second DA conversion circuit 231, as shown in FIG. 5.

Therefore, the control logic circuit 240 may compute the period T1 of the PWM signal SPWM according to Equation 3, and compute the pulse width T2 of the PWM signal SPWM according to Equation 4.

$$T1 = VREF1/\left[\frac{I1 \times R1}{2^{N1}}\right] \times 1/CLK \quad \text{[Equation 3]}$$

$$T2 = VREF2/\left[\frac{I2 \times R2}{2^{N2}}\right] \times 1/CLK \quad \text{[Equation 4]}$$

In Equation 3, R1 denotes the resistance of the first resistor Ra, VREF1 denotes the first comparison voltage, N1 denotes the number of bits of the first analog output signal output from the first DA conversion circuit 221, and CLK denotes the period of the clock signal. In Equation 4, R2 denotes the resistance of the second resistor Rb, VREF2 denotes the second comparison voltage, N2 denotes the number of bits of the second analog output signal AO2 output from the second DA conversion circuit 231, and CLK denotes the period of the clock signal.

The control logic circuit 240 may compute the frequency f of the PWM signal SPWM according to Equation 5, and may compute the duty ratio DuR of the PWM signal SPWM according to Equation 6.

$$f = 1/T1 \quad \text{[Equation 5]}$$

$$\text{Duty} = T2/T1 \quad \text{[Equation 6]}$$

According to this embodiment, the period T1, pulse width T2, and duty ratio of the PWM signal SPWM may be adjusted by adjusting the first resistor Ra, the second resistor Rb, the first current I1, and the second current I2 included in the regulation circuit 110_2.

Referring to Equations 3 to 6, since the period T1 of the PWM signal SPWM is affected by the resistance R1 of the first resistor Ra, and the pulse width T2 of the PWM signal SPWM is affected by the resistance R2 of the second resistor Rb, while the amount of change of each of the resistances R1 and R2 according to the change of the ambient temperature is the same, the change of the duty ratio DuR of the PWM signal SPWM according to the change of the ambient temperature is eliminated.

Figure 6:
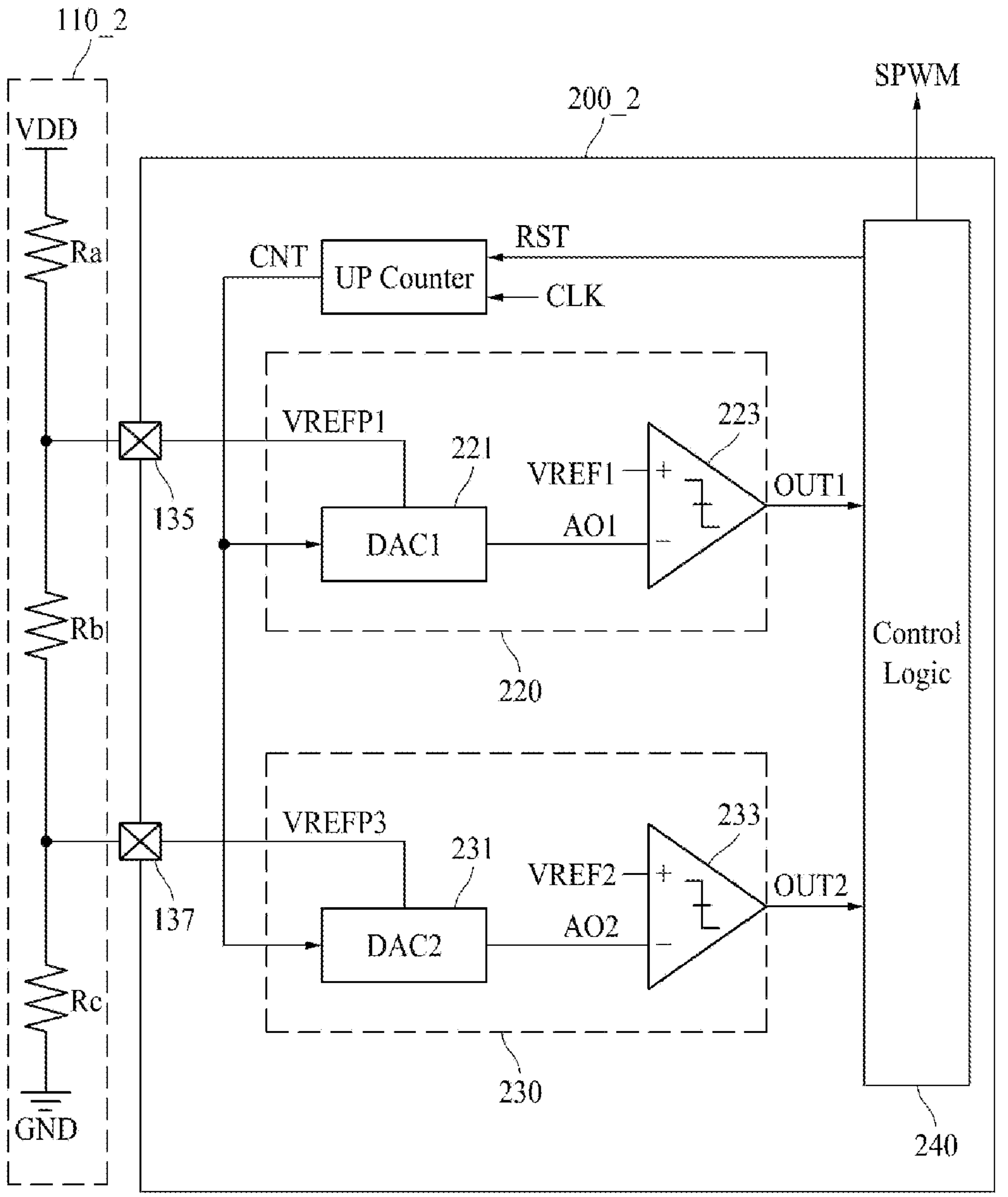
FIG. 6 is another exemplary block diagram of a regulation circuit and PWM signal generation circuit of the present disclosure.

FIG. 6 is another exemplary block diagram of a regulation circuit and PWM signal generation circuit of the present disclosure.

For simplicity, FIG. 6 illustrates and describes the regulation circuit 110_2 including resistors Ra, Rb, and Rc and the PWM signal generation circuit 200_2. The regulation circuit 110_2 and PWM signal generation circuit 200_2 shown in FIG. 6 may be another example of the regulation circuit 110 and PWM signal generation circuit 200 shown in FIG. 1. The configuration of the regulation circuit 110_2 and the PWM signal generation circuit 200_2 shown in FIG. 6, which are different from the regulation circuit 110_1 and the PWM signal generation circuit 200_1 of FIG. 3, and the first reference voltage to the fourth reference voltage VREFP1 to VREFP4 corresponding thereto will be described in detail. A description of the same elements and operations as those of the regulation circuit 110_1 and the PWM signal generation circuit 200_1 shown in FIG. 3 will be omitted.

The first resistor Ra is connected between the voltage line supplying the operating voltage VDD and the third pin 135, the second resistor Rb is connected between the third pin 135 and the fourth pin 137, and the third resistor Rc is connected between the fourth pin 137 and the ground GND.

The PWM signal generation circuit 200_2 includes the third pin 135, the fourth pin 137, a counting circuit 210, a pulse period control circuit 220, a pulse width control circuit 230, and a control logic circuit 240.

The operating voltage VDD supplied along the voltage line is divided according to the first resistor Ra, the second resistor Rb, and the third resistor Rc into voltages applied to the third pin 135 and the fourth pin 137, respectively. Specifically, a voltage of a value calculated according to Equation 7 is applied to the third pin 135 as the first reference voltage VREFP1, and a voltage of a value calculated according to Equation 8 is applied to the fourth pin 137 as the third reference voltage VREFP3. In this case, the second reference voltage VREFP2 and the fourth reference voltage VREFP4 may be 0 V.

$$VREFP1 = VDD \times (R2 + R3)/(R1 + R2 + R3) \quad \text{[Equation 7]}$$

$$VREFP2 = VDD \times (R3)/(R1 + R2 + R3) \quad \text{[Equation 8]}$$

The first DA conversion circuit 221 of the pulse period control circuit 220 is connected to the third pin 135 such that the first reference voltage VREFP1 calculated according to Equation 7 above is applied thereto. In response to the clock signal CLK, the first DA conversion circuit 221 outputs the first analog output signal AO1, which is increased by the value obtained by dividing the difference between the first reference voltage VREFP1 and the second reference voltage VREFP2 by the number of steps that can be output from the first DA conversion circuit 221.

The second DA conversion circuit 231 of the pulse width control circuit 230 is connected to the fourth pin 137 such that the third reference voltage VREFP3 calculated according to Equation 8 above is applied thereto. In response to the clock signal CLK, the second DA conversion circuit 231 outputs the second analog output signal AO2, which is increased by the value obtained by dividing the difference between the third reference voltage VREFP3 and the fourth reference voltage VREFP4 by the number of steps that can be output from the second DA conversion circuit 231.

According to this embodiment, the control logic circuit 240 may calculate the period T1 of the PWM signal SPWM according to Equation 9, and may calculate the pulse width T2 of the PWM signal SPWM according to Equation 10.

$$T1 = VREF1 / \left[ \frac{VDD \times (R2 + R3)/(R1 + R2 + R3)}{2^{N1}} \right] \times 1/CLK \quad \text{[Equation 9]}$$

$$T2 = VREF2 / \left[ \frac{VDD \times (R3)/(R1 + R2 + R3)}{2^{N2}} \right] \times 1/CLK \quad \text{[Equation 10]}$$

In Equation 9, R1 denotes the resistance of the first resistor Ra, R2 denotes the resistance of the second resistor Rb, R3 denotes the resistance of the third resistor Rc, VREF1 denotes the first comparison voltage, N1 denotes the number of bits of the first analog output signal AO1 output from the first DA conversion circuit 221, and CLK denotes the period of the clock signal. In Equation 10, R1 denotes the resistance of the first resistor Ra, R2 denotes the resistance of the second resistor Rb, R3 denotes the resistance value of the third resistor Rc, VREF2 denotes the second comparison voltage, N2 denotes the number of bits of the second analog output signal AO2 output from the second DA conversion circuit 231, and CLK denotes the period of the clock signal.

The control logic circuit 240 may calculate the frequency f of the PWM signal SPWM according to Equation 11, and may calculate the duty ratio DuR of the PWM signal SPWM according to Equation 12.

$$f = 1/T1 \quad \text{[Equation 11]}$$

$$DuR = T2/T1 \quad \text{[Equation 12]}$$

According to this embodiment, the period T1, pulse width T2, and duty ratio of the PWM signal SPWM may be adjusted by adjusting the ratio of the first resistor Ra, the second resistor Rb, the third resistor Rc included in the regulation circuit 110_2.

Referring to Equations 7 to 12, since the period T1 of the PWM signal SPWM is affected by the resistance R1 of the first resistor Ra, the resistance R2 of the second resistor Rb, and the resistance R3 of the third resistor Rc, and the pulse width T2 of the PWM signal SPWM is affected by the resistance R1 of the first resistor Ra, the resistance R2 of the second resistor Rb, and the resistance R3 of the third resistor Rc, while the amount of change of each of the resistances R1, R2 and R3 according to the change of the ambient temperature is the same, the change of the duty ratio DuR of the PWM signal SPWM according to the change of the ambient temperature is eliminated.

Figure 7:
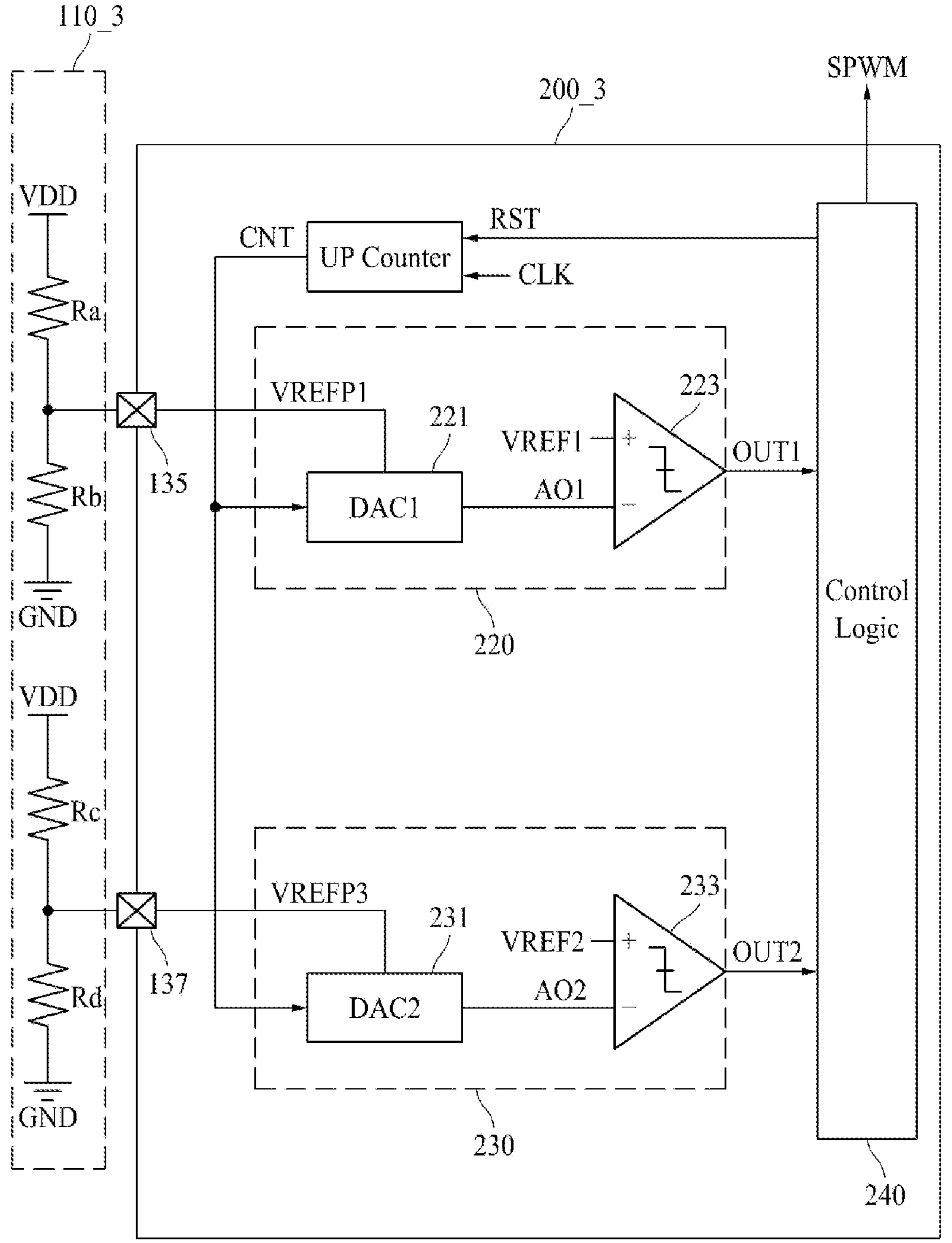
FIG. 7 is another exemplary block diagram of the regulation circuit and PWM signal generation circuit of the present disclosure.

FIG. 7 is another exemplary block diagram of the regulation circuit and PWM signal generation circuit of the present disclosure.

For simplicity, FIG. 7 illustrates and describes a regulation circuit 110_3 including resistors Ra, Rb, Rc and Rd and a PWM signal generation circuit 200_3. The regulation circuit 110_3 and PWM signal generation circuit 200_3 shown in FIG. 7 may be another example of the regulation circuit 110 and PWM signal generation circuit 200 shown in FIG. 1. The configuration of the regulation circuit 110_3 and the PWM signal generation circuit 200_3 shown in FIG. 7, which are different from the regulation circuit 110_1 and the PWM signal generation circuit 200_1 of FIG. 3, and the first reference voltage to the fourth reference voltage VREFP1 to VREFP4 corresponding thereto will be described in detail. A description of the same elements and operations as those of the regulation circuit 110_1 and the PWM signal generation circuit 200_1 shown in FIG. 3 will be omitted.

The first resistor Ra is connected between a first voltage line supplying the operating voltage VDD and the third pin 135, the second resistor Rb is connected between the third pin 135 and ground GND, the third resistor Rc is connected between the second voltage line supplying the operating voltage VDD and the fourth pin 137, and the fourth resistor Rd is connected between the fourth pin 137 and ground GND.

The PWM signal generation circuit 200_3 includes the third pin 135, the fourth pin 137, a counting circuit 210, a pulse period control circuit 220, a pulse width control circuit 230, and a control logic circuit 240.

In another embodiment, The operating voltage VDD supplied along the voltage line is divided according to the resistances of the first resistor Ra, the second resistor Rb, the third resistor Rc, and the fourth resistor Rd into voltages applied to the third pin 135 and the fourth pin 137, respectively. In this case, the second reference voltage VREFP2 and the fourth reference voltage VREFP4 may be 0 V.

$$VREFP1 = VDD \times (R2)/(R1 + R2) \quad \text{[Equation 13]}$$

$$VREFP2 = VDD \times (R4)/(R3 + R4) \quad \text{[Equation 14]}$$

The first DA conversion circuit 221 of the pulse period control circuit 220 is connected to the third pin 135 such that the first reference voltage VREFP1 calculated according to Equation 13 above is applied thereto. In response to the clock signal CLK, the first DA conversion circuit 221 outputs the first analog output signal AO1, which is increased by the value obtained by dividing the difference between the first reference voltage VREFP1 and the second reference voltage VREFP2 by the number of steps that can be output from the first DA conversion circuit 221.

The second DA conversion circuit 231 of the pulse width control circuit 230 is connected to the fourth pin 137 such that the third reference voltage VREFP3 calculated according to Equation 14 above is applied thereto. In response to the clock signal CLK, the second DA conversion circuit 231 outputs the second analog output signal AO2, which is increased by the value obtained by dividing the difference between the third reference voltage VREFP3 and the fourth reference voltage VREFP4 by the number of steps that can be output from the second DA conversion circuit 231.

Accordingly, the control logic circuit 240 may calculate the period T1 of the PWM signal SPWM according to Equation 15, and may calculate the pulse width T2 of the PWM signal SPWM according to Equation 16.

$$T1 = VREF1 / \left[ \frac{VDD \times (R2)/(R1 + R2)}{2^{N1}} \right] \times 1/CLK \quad \text{[Equation 15]}$$

$$T2 = VREF2 / \left[ \frac{VDD \times (R4)/(R3 + R4)}{2^{N2}} \right] \times 1/CLK \quad \text{[Equation 16]}$$

In Equation 15, R1 denotes the resistance of the first resistor Ra, R2 denotes the resistance of the second resistor Rb, R3 denotes the resistance of the third resistor Rc, R4 denotes the resistance of the fourth resistor Rd, VREF1 denotes the first comparison voltage, N1 denotes the number of bits of the first analog output signal AO1 output from the first DA conversion circuit 221, and CLK denotes the period of the clock signal. In Equation 16, R3 denotes the resistance value of the third resistor Rc, R4 denotes the resistance of the fourth resistor Rd, VREF2 denotes the second comparison voltage, N2 denotes the number of bits of the second analog output signal AO2 output from the second DA conversion circuit 231, and CLK denotes the period of the clock signal.

The control logic circuit 240 may calculate the frequency f of the PWM signal SPWM according to Equation 17, and may calculate the duty ratio DuR of the PWM signal SPWM according to Equation 18.

$$f=1/T1 \quad \text{[Equation 17]}$$

$$DuR=T2/T1 \quad \text{[Equation 18]}$$

According to this embodiment, the period T1, pulse width T2, and duty ratio of the PWM signal SPWM may be adjusted by adjusting the ratio of the first resistor Ra, the second resistor Rb, the third resistor Rc, and the fourth resistor Rd included in the regulation circuit 110_3.

Referring to Equations 13 to 18, since the period T1 of the PWM signal SPWM is affected by the resistance R1 of the first resistor Ra, the resistance R2 of the second resistor Rb, the resistance R3 of the third resistor Rc, and the resistance R4 of the fourth resistor, and the pulse width T2 of the PWM signal SPWM is affected by the resistance R1 of the first resistor Ra, the resistance R2 of the second resistor Rb, the resistance R3 of the third resistor Rc, and the resistance R4 of the fourth resistor, while the amount of change of each of the resistances R1 to R4 according to the change of the ambient temperature is the same, the change of the duty ratio DuR of the PWM signal SPWM according to the change of the ambient temperature is eliminated.

As is apparent from the above description, the present disclosure has the following effects.

According to the present disclosure, a pulse width modulation signal generation circuit capable of adjusting a frequency and a duty ratio may generate a PWM signal whose duty ratio remains constant even when the ambient temperature changes.

Furthermore, according to the present disclosure, a pulse width modulation signal generation circuit capable of adjusting a frequency and a duty ratio may improve a nonlinearity of a discharge voltage affecting a PWM signal.

It will be appreciated by those skilled in the art to which the present disclosure belongs that the disclosure described above can be practiced in other specific forms without altering its technical ideas or essential features.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. A pulse width modulation (PWM) signal generation circuit comprising:

a counting circuit configured to generate a counting signal by counting one of a rising edge and a falling edge of a clock signal;

a pulse period control circuit configured to convert the counting signal into a first analog output signal and to compare the first analog output signal with a first comparison voltage to generate a first output signal corresponding to a result of comparison;

a pulse width control circuit configured to convert the counting signal into a second analog output signal and to compare the second analog output signal with a second comparison voltage to generate a second output signal corresponding to a result of comparison; and a control logic circuit configured to:

determine a period of a PWM signal based on the first output signal;

determine a pulse width of the PWM signal based on the second output signal; and output the PWM signal having the period and the pulse width, wherein the pulse period control circuit comprises:

a first digital-to-analog conversion circuit configured to output, as the first analog output signal, a voltage corresponding to the counting signal among voltages less than or equal to a first reference voltage and greater than or equal to a second reference voltage; and a first comparison circuit configured to:

receive the first comparison voltage via a non-inverting input terminal and receive the first analog output signal via an inverting input terminal;

compare the first comparison voltage with the first analog output signal;

output the first output signal in a first state based on the first analog output signal being less than the first comparison voltage; and output the first output signal transitioned from the first state to a second state via an output terminal based on the first analog output signal being greater than the first comparison voltage, and wherein the pulse width control circuit comprises:

a second digital-to-analog conversion circuit configured to output, as the second analog output signal, a voltage corresponding to the counting signal among voltages less than or equal to a third reference voltage and greater than or equal to a fourth reference voltage; and a second comparison circuit configured to:

receive the second comparison voltage via a non-inverting input terminal and receive the second analog output signal via an inverting input terminal;

compare the second comparison voltage with the second analog output signal;

output the second output signal in a first state based on the second analog output signal being less than the second comparison voltage; and output the second output signal transitioned from the first state to a second state via an output terminal based on the second analog output signal being greater than the second comparison voltage.

2. The PWM signal generation circuit of claim 1, wherein the control logic circuit determines the period of the PWM signal according to Equation 1 below:

$$T1 = VREF1/\left[\frac{VREFP1 - VREFP2}{2^{N1}}\right] \times 1/CLK, \quad \text{Equation 1}$$

wherein:

VREF1 denotes the first comparison voltage;

VREFP1 denotes the first reference voltage;

VREFP2 denotes the second reference voltage;

N1 denotes the number of bits of the first analog output signal; and

CLK denotes a period of the clock signal.

3. The PWM signal generation circuit of claim 1, wherein the control logic circuit determines the period of the PWM signal according to Equation 2 below:

$$T2 = VREF2/\left[\frac{VREFP3 - VREFP4}{2^{N2}}\right] \times 1/CLK, \qquad \text{Equation 2}$$

wherein:

VREF2 denotes the second comparison voltage;

VREFP3 denotes the third reference voltage;

VREFP4 denotes the fourth reference voltage;

N2 denotes the number of bits of the second analog output signal; and

CLK denotes a period of the clock signal.

4. The PWM signal generation circuit of claim 1, wherein the control logic circuit is configured to determine a reset timing of the counting signal based on a change in level of the first output signal to provide a reset signal to the counting circuit.

5. The PWM signal generation circuit of claim 1, wherein the control logic circuit is configured to generate a reset signal and provide the reset signal to the counting circuit, the reset signal transitioning from a high level to a low level at a moment when the first output signal transitions from the first state to the second state.

* * * * *